(12) United States Patent
Okabe et al.

(10) Patent No.: US 7,503,678 B2
(45) Date of Patent: Mar. 17, 2009

(54) ROOM LAMP

(75) Inventors: Toshiaki Okabe, Haibara-gun (JP); Kentaro Nagai, Haibara-gun (JP); Kenji Oishi, Haibara-gun (JP); Masahiro Sawayanagi, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/927,446

(22) Filed: Aug. 27, 2004

(65) Prior Publication Data

US 2005/0083700 A1   Apr. 21, 2005

(30) Foreign Application Priority Data

Aug. 28, 2003 (JP) ............................ P2003-304446
Sep. 2, 2003 (JP) ............................ P2003-310054

(51) Int. Cl.
*B60Q 1/26* (2006.01)

(52) U.S. Cl. ....................... 362/490; 362/653

(58) Field of Classification Search ................. 362/488, 362/490, 364, 365
See application file for complete search history.

(56) References Cited

U.S. PATENT DOCUMENTS

| | | | | |
|---|---|---|---|---|
| 5,239,449 | A | * | 8/1993 | Wnuk et al. ................. 362/490 |
| 5,357,408 | A | * | 10/1994 | Lecznar et al. .............. 362/490 |
| 5,366,127 | A | * | 11/1994 | Heinz .......................... 224/313 |
| 5,526,241 | A | * | 6/1996 | Ferrell ......................... 362/490 |
| 5,944,414 | A | * | 8/1999 | Nishitani et al. ............ 362/490 |
| 6,799,875 | B2 | * | 10/2004 | Flokstra et al. ............. 362/521 |
| 2002/0041496 | A1 | | 4/2002 | Hatagishi et al. |
| 2002/0126495 | A1 | * | 9/2002 | Nagata ........................ 362/488 |
| 2003/0072166 | A1 | * | 4/2003 | Sinzawa et al. ............. 362/488 |
| 2003/0147249 | A1 | * | 8/2003 | Hatagishi et al. ............ 362/488 |

FOREIGN PATENT DOCUMENTS

| | | |
|---|---|---|
| DE | 101 48 107 A1 | 10/2000 |
| DE | 199 27 141 C1 | 11/2000 |
| EP | 1 174 309 A2 | 1/2002 |
| EP | 1 281 572 A2 | 2/2003 |
| FR | 2 870 492 | 5/2005 |
| JP | 2002-036948 A | 2/2002 |

(Continued)

OTHER PUBLICATIONS

Japanese Office Action dated Jul. 23, 2008.

(Continued)

*Primary Examiner*—Anabel M Ton
*Assistant Examiner*—Julie A Shallenberger
(74) *Attorney, Agent, or Firm*—Sughrue Mion, PLLC

(57) ABSTRACT

A room lamp which is cost effective and simple. The room lamp has a design part and a function part, the design part being secured with a lens in a housing attachable to an opening defined in an interior finish material of a vehicle, and the function part being disposed at a side of a rear face of the interior finish material in that the function part is supported by the design part, and having a light source. Clips are provided in the housing for temporarily securing the design part at predetermined positions. Projections project from the edge part of the opening along the rear face of the interior finish material. The housing and the projections hold the interior finish material.

6 Claims, 22 Drawing Sheets

FOREIGN PATENT DOCUMENTS

| | | |
|---|---|---|
| JP | 2002-067789 A | 3/2002 |
| JP | 2002-127819 A | 5/2002 |
| JP | 2002-218635 A | 8/2002 |
| JP | 2002-345143 A | 11/2002 |
| JP | 2003-040032 A | 2/2003 |
| JP | 2003072464 A | 3/2003 |
| JP | 2003-095017 A | 4/2003 |

OTHER PUBLICATIONS

Japanese Office Action dated Jul. 16, 2008.

* cited by examiner

ROOM LAMP

BACKGROUND OF THE INVENTION

1. Field of the invention

The present invention relates to a room lamp.

2. Related art

A vehicle is usually furnished with a sun-visor for shading backlight. Some of the sun-visors are often provided with miniature mirrors aside from rearview mirrors.

In case of providing the mirror to the sun-visor, for using the mirror even at night, the room lamp is sometimes furnished near a windshield glass in a ceiling. The room lamp is apart from a doom lamp furnished near the center of the ceiling.

Further, the room lamp is disposed at a position to be hidden by the sun-visor when the sun-visor is folded toward the ceiling. The room lamp is very small sized comparing with a doom mirror, since it is used only when using the mirror.

Besides, the mirror of the sun-visor is often furnished with a cover opening and closing by sliding. The sun-visor is sometimes so constructed as to light the room lamp when opening the cover.

FIG. 15 is a disassembled view of a prior art room lamp 1. The room lamp 1 comprises a design part 11 and a function part 12 detachably attached to the design part 11. The design part 11 comprises a frame shaped bezel 13, a lens 15 provided over an opening 14 of the bezel 13, and clips 16 provided at both sides of the bezel 13. In addition, the function part 12 has a bulb (an electric lamp) 17 and a function main body 18.

The room lamp 1 is, as shown in FIG. 16, mounted in an opening 20 formed in a trim (an interior finish material) in the ceiling of a vehicle. In this case, the room lamp 1 is supported by catching the clips 16 thereof at the edge of the opening 20. By the way, numeral 22 in FIG. 16 is an electric cable connected to the function main body 18, and numeral 23 is a car body (a metal).

In regard to the function part 12 of the room lamp 1, as shown in FIG. 17, a concave part 24 is defined in the function main body 18, and the concave part 24 is furnished therein with pressure cutting-edges 25. The pressure cutting-edges 25 are formed at distal portions with V-shaped grooves 25a, and are connected to the bulb 17. The concave part 24 is provided with an opening-closing cover 26.

The flat cables 22 are connected to the function part 12, as shown in FIG. 18, by inserting the flat cables 22 in the concave part 24 and putting them in the V-shaped grooves 25a formed at the distal portions of the pressure cutting-edges 25, and as shown in FIG. 19, when the cover 26 is closed, the flat cables 22 are pushed toward the pressure cutting-edges 25, and insulating films of the flat cables 22 are broken by the pressure cutting-edges 25, so that cores thereof are electrically connected to the pressure cutting-edges 25. The flat cables 22 are thereby connected to the bulb 17 via the pressure cutting-edges 25.

Herein, the cover 26 is formed, on a face at the side of the pressure cutting-edges 25, with projections 26a for pressing the flat cables 22. A space between the projections 26a and 26a is substantially flat. The flat cables 22 are securely urged into the grooves 25a by the projections 26a.

Next, explanation will be made to a method of attaching the above mentioned room lamp 1 to the ceiling trim 19 of the vehicle. On the ceiling trim 19 to be attached with the room lamp 1, as shown in FIG. 20, there are formed a hole 30 for attaching the doom lamp and holes 31 for attaching the room lamps (called as "room lamp attaching hole(s)" hereafter).

At first, as shown in FIG. 21, in the room lamps attaching holes 31 in the ceiling trim 19, an only design part 11 of the room lamp 1 is attached. Next, as shown in FIG. 22, the function part 12 is in the design part 11. The flat cable 22 has been in advance connected to the function part 12. Subsequently, as shown in FIG. 23, the ceiling trim 19 is attached to the ceiling 32a of the vehicle main body 32.

For exchanging the bulb 17 of the room lamp 1, as shown in FIG. 24, the whole of the room lamp 1 is removed from the ceiling trim 19. At this time, for avoiding action of tension on the flat cable 22, the flat cable 22 has an extra part 22a.

The extra parts 22a of the flat cables 22 are, as shown in FIG. 25, held by clips 33 provided to the function part 12. As shown in FIG. 26, the clips 33 are formed to be almost L-shape. In the space between the clip 33 and the function main body 18, the flat cables are inserted and held.

A space b1 between both insides of the clip 33 is formed to be almost the same as an inserting width b2 of the flat cables 22. Further, on the insides of the clip 33, catching pawls 34 are formed to be mutually opposite, and between the catching pawls 34, 34, an insertion passage 35 is defined for inserting the flat cables 22 inside of the clips 33.

These structure are shown in Unexamined Japanese Patent Publication 2002-67789, 2002-218635 and 2002-345143.

However, the prior art room lamp 1 has been involved with a problem that since the design part 11 has two pieces of clips 16 at both sides thereof for attaching the room lamp 1 to the ceiling trim 19, the room lamp 1 and the room lamp attaching holes 31 in the ceiling trim 19 are large sized. This case has another problem that the room lamp 1 is expensive.

FIG. 27 disassembled views of a prior art room lamp 120 to be attached to a substantial center part of a ceiling face of a vehicle as shown in Unexamined Japanese Patent Publication 2003-40032.

The room lamp 120 has a design part B and a function part A detachably attached to the design part B. The design part B has a frame shaped housing 141, a lens 181 furnished in the housing 141, and catching pawls 142 provided at both sides of the housing 141. The function part A has a bulb (an electric lamp) 124 and a function main body 121, and is attached to an opening 146 of the housing 141.

Further, the room lamp 120 has fixtures 143, flexible arms 147, and flexible arm controllers 147a, said fixtures 143 being provided vertically toward a side of a reinforce 160 of the housing 141 for mutually fixing the room lamp 120 and the reinforce 160 of the vehicle, said flexible arms 147 being bend in a reverse U-shape and engaged at its front end with an attaching part 183 of the reinforce 160, and said flexible arm controller 147a being disposed at the side of the flexible arms 147 and engaged with supporting pieces 145 of the flexible arms 147 in order to control front ends being displacing along an attaching-detaching direction of the room lamp 101.

FIG. 28 shows another room lamp 101 of the prior art to be attached to the substantial center part of the ceiling face of the vehicle as shown in Unexamined Japanese Patent Publication 2002-127819.

The room lamp 101 is formed with an opening 185 in a skeletal member to be fixed to the side of an interior of a roof panel, and has a first engaging instrument 106 formed along the opening 185, second engaging instruments 107 projecting from end parts 185b of the opening 185, and third engaging instruments 108 arranged in positions along the end part 185b of the opening 185.

The room lamp 101 is provided with first and second pawls 111, 112 engaging with the first and second engaging instruments 106, 107, and mounting instruments 113 enabling to mount on the third engaging instruments. The room lamp 101 interposes a previously set up roof trim 104 and is engaged with and supported by the skeletal member 102.

However, the room lamp 120 shown in FIG. 27 has had a problem that a fixture 143 is necessary for fixing the room lamp 120 to the reinforce 160, so that a structure is made complicated and invites cost-up.

Another problem is that the side of the vehicle needs the reinforce 160, and increases the number of parts to invite cost-up.

A further problem is that since the room lamp 101 shown in FIG. 28 necessitates a skeletal member 102 for securing the room lamp 101 to the side of the vehicle, the number of parts increase to invite cost-up. A still further problem is that since engaging measures 106, 107 are also necessary to fix the skeletal member to the side of the room lamp 101, a structure is made complicated and cost goes up.

SUMMARY OF THE INVENTION

It is an object of the invention to provide a room lamp which can be miniaturized.

It is another object of the invention to provide a room lamp which simplifies the structure and is possible to cost down.

For accomplishing the above mentioned object, the invention is provided a design part which is secured with a lens in a bezel attachable to an opening formed in an interior finish material of a vehicle, and a function part which is disposed to a rear side of the interior finish material in that the function part is supported by the design part and which has a light source, wherein the design part is the room lamp which may engage an edge portion of the opening by a clip provided by the bezel, and the function main body of the function part is supported by the function part such that the function main body projects along the rear face of the interior finish material from the edge portion of the opening.

The invention can hold the edge portion of the room lamp attaching hole formed in the ceiling trim by the function main body of the function part and the design part. The room lamp can be held in that a clip is caught at one edge portion of the room lamp, and the other edge is kept between the design part main body and the design part. That is, since the clip is enough with one side, the room lamp may be reduced in size.

Herein, an elastic member can be provided, which projects toward the rear face of the interior finish material from the function main body. In this case, when the ceiling trim is kept by the function main body and the design part, the elastic member is pressed to the ceiling trim, so that the room lamp may be prevented from rattling.

Further, the cover which releases the interior of the function main body is formed as one body to the function main body via a thin hinge, and when the cover closes the function main body, the thin hinge projects than the function main body toward the rear face of the interior finish material, so that the thin hinge may be structured to serve as the elastic member.

In this case, since the hinge member may be also used as the elastic member, it is possible to save the number of parts and realize cost-down.

The end part at the side of the function main body in the thin hinge is formed such that it projects from the function main body toward the rear face of the interior finish material, and concurrently the end part at the side of the cover in the thin hinge is formed to project from the cover along an extended flat face of the surface in the cover.

In this case, although being thin, the thin hinge can have good elasticity.

Strength in the curve at the end part at the side of the function main body in the thin hinge may be made higher than strength in the curve at the end part at the side of the cover in the thin hinge.

In this case, since the end part at the side of the function main body in the thin hinge has the comparatively large curve, this part projects comparatively largely from the function main body. Accordingly, this projecting part may be preferably used as the elastic member.

According to the invention, since the clip is sufficient with one piece for attaching the room lamp to the ceiling trim, the room lamp can be miniaturized.

For accomplishing the above mentioned object, the invention is a room lamp which has a design part and a function part, said design part being secured with a lens in a housing attachable to an opening defined in a interior finish material of a vehicle, and said function part being disposed at a side of a rear face of the interior finish material in that the function part is supported by the design part, and having a light source, characterized in that clips are provided in the housing for temporarily securing the design part at predetermined positions, said clips being able to engage the edge part of the opening, and the function part holds the interior finish material at the design part for providing self-preservation.

The invention is self-preserved in that the function part holds the interior finish material in the design part, and it is therefore unnecessary to provide any fixture or engaging member for securing the room lamp in the interior finish material as the prior art. Any reinforcing member is not required to provide at the side of the interior finish material.

The invention is provided in that the projections project from the edge part of the opening along the rear face of the interior finish material and are provided to the function main body of the function part, and the housing and the projections hold the interior finish material.

According to the invention, it is unnecessary to provide the fixture for fixing the room lamp to the interior finish material or to provide the engaging member, so that the structure may be simplified and the cost-down is possible. Any reinforcing member is not required to the interior finish material of the vehicle, so that the number of parts may be saved and the cost-down is possible.

DETAILED DESCRIPTION OF THE PREFERRED EMBODIMENTS

Embodiments according to the invention will be explained in detail with reference to the attached drawings.

First Embodiment

Figure 1:
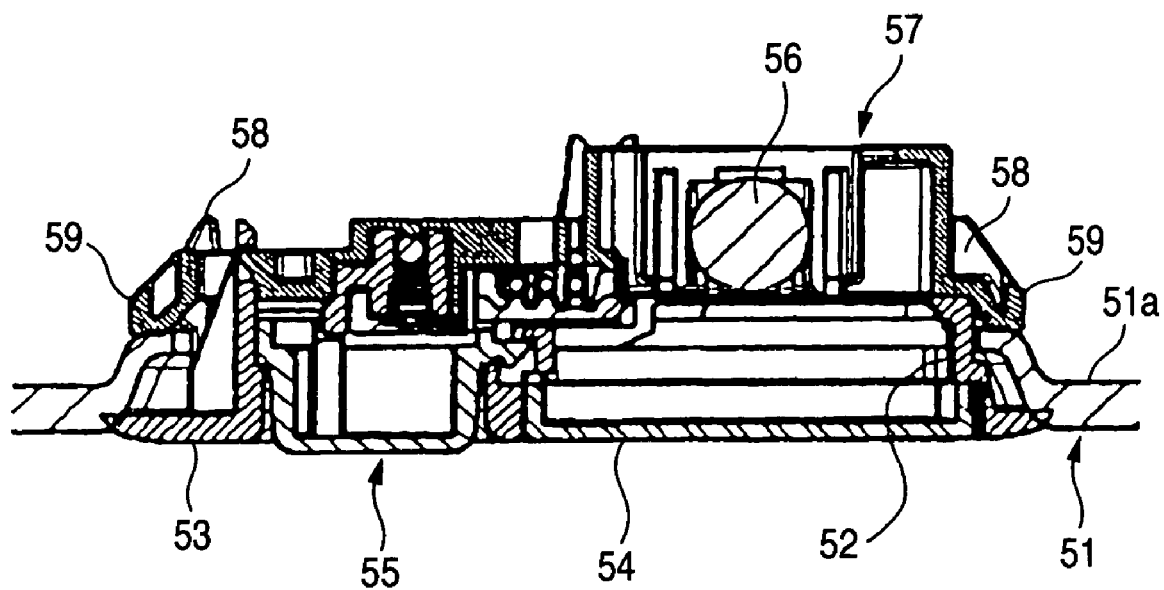
FIG. 1 is a cross sectional view showing a first embodiment according to the invention.

As shown in FIG. 1, the room lamp 5 of the first embodiment according to the invention has the design part 55 and the function part 57, said design part 55 being secured with the lens 54 in the bezel 53 attachable to the opening 52 defined in the ceiling trim (the interior finish material), and said function part 57 being disposed at the rear side of the ceiling trim 51 in that the function part 57 is supported by the design part 55, and having the light source 56.

Figure 2:
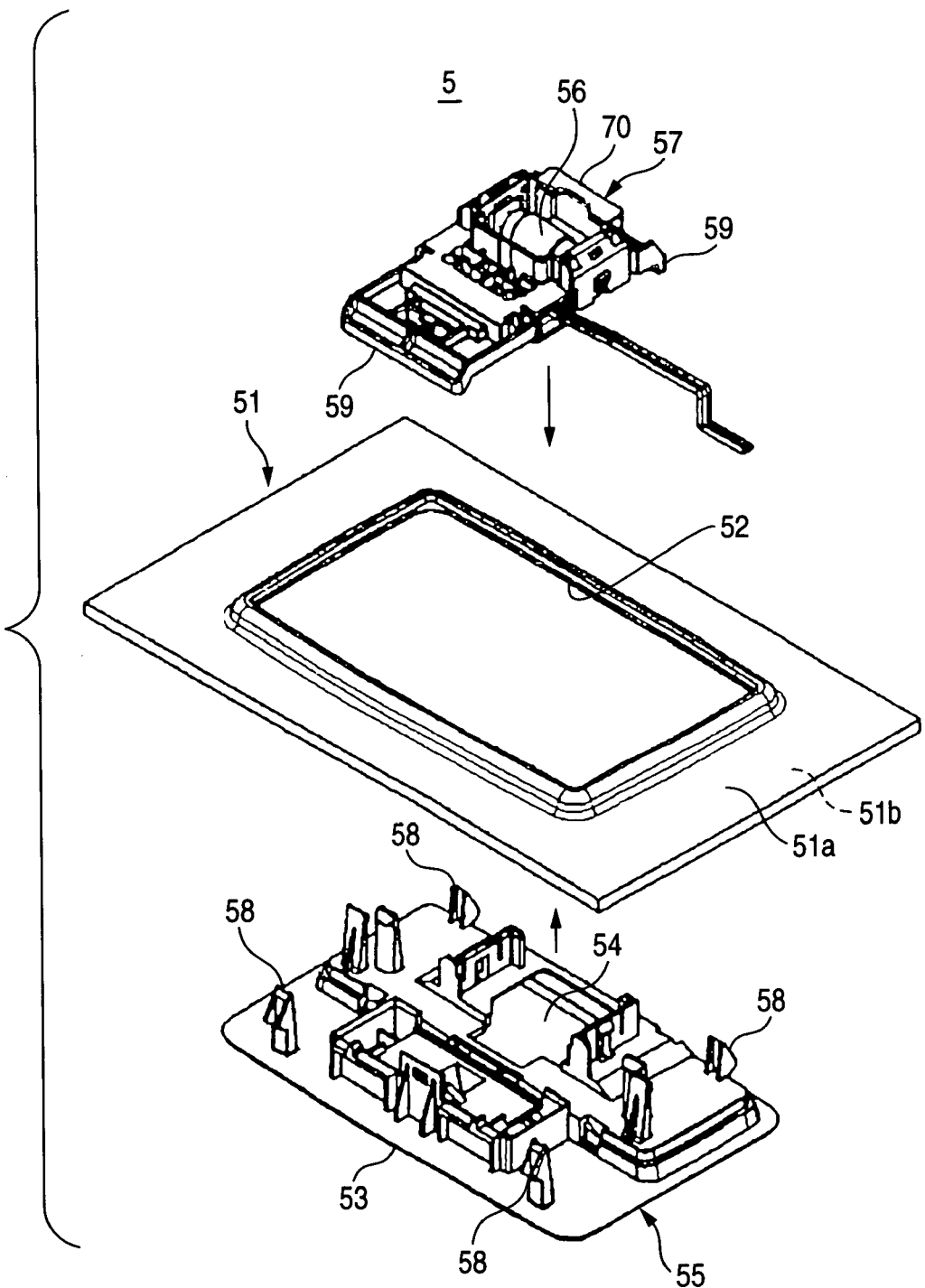
FIG. 2 is an upper view showing the function part of the first embodiment according to the invention.

The bezel 53 of the design part 55 has the clip 58. The function main body 60 of the function part 57 is, as shown in FIG. 2, provided another clip 62 for holding the extra parts 61a of the flat cables 61 (see FIG. 1).

Figure 3:
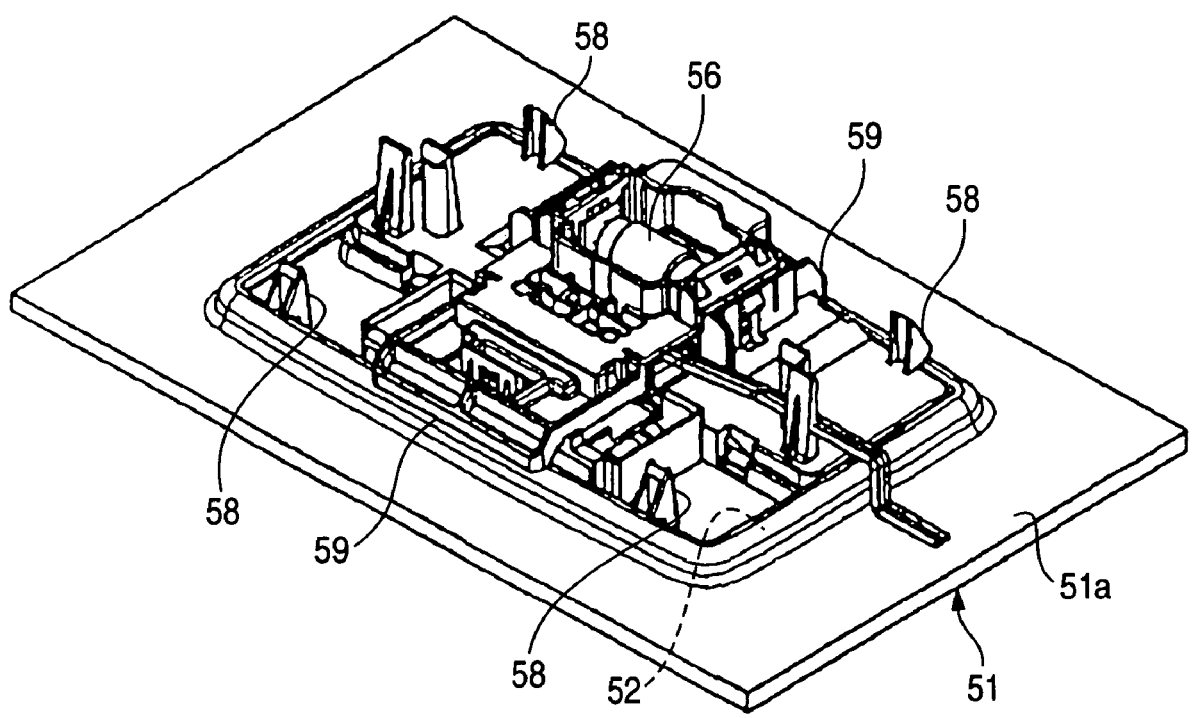
FIG. 3 is a perspective view seen from the upper side showing the first embodiment according to the invention.

Further, the function main body 60 is, as shown in FIG. 3, formed with a concave part 63 for inserting the flat cables 61. In the concave part 63, the pressure cutting-edges (not shown) are provided for connecting the flat cables 61. The function main body 60 is furnished with the cover 64 enabling to insert in the concave part 63.

Figure 4:
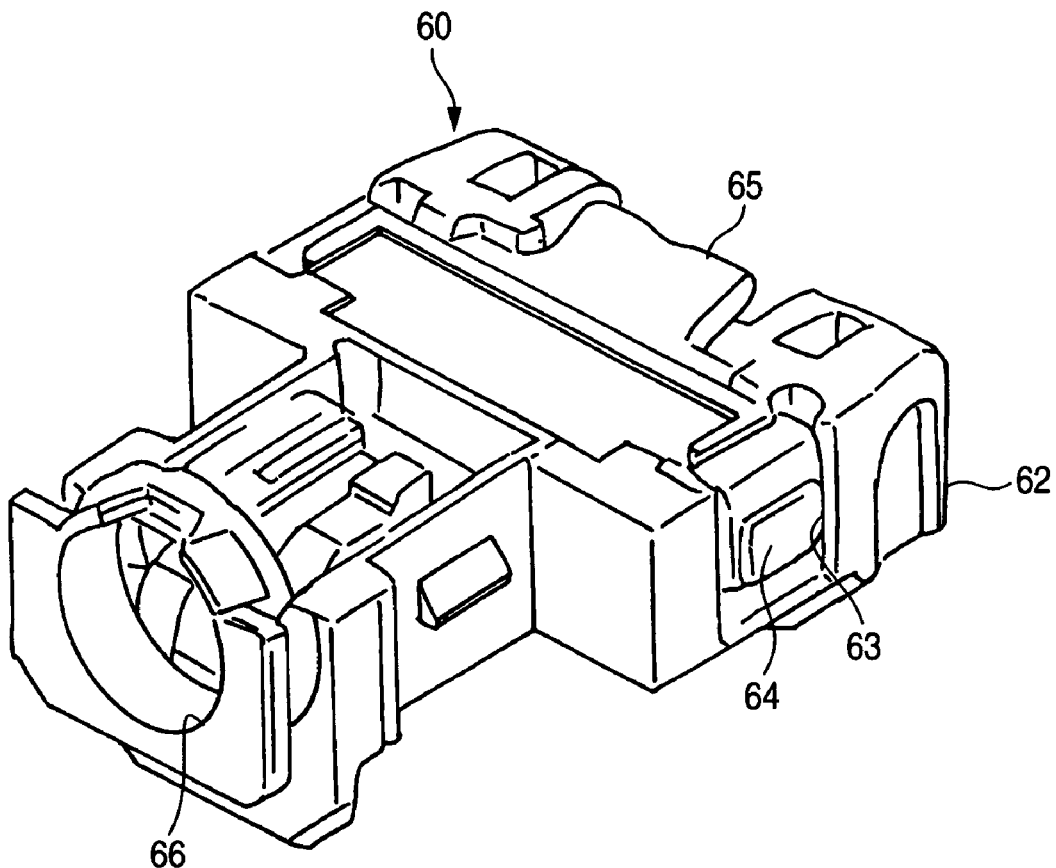
FIG. 4 is a perspective view seen from a lower side showing the first embodiment according to the invention.

The cover 64 is, as shown in FIG. 4, provided as one body with the thin hinge 65 projecting from the function main body 60 toward the rear face 51a of the ceiling trim 51. The thin hinge 65 functions as the elastic member as later mentioned. Numeral 66 in FIG. 4 is a hole for attaching the light source.

As shown in FIG. 1, the room lamp 5 is so structured that it can keep the edge part of the room lamp attaching hole 52 formed in the ceiling trim 51 by the function main body 60 of the function part 57 and the design part 55.

Figure 5:
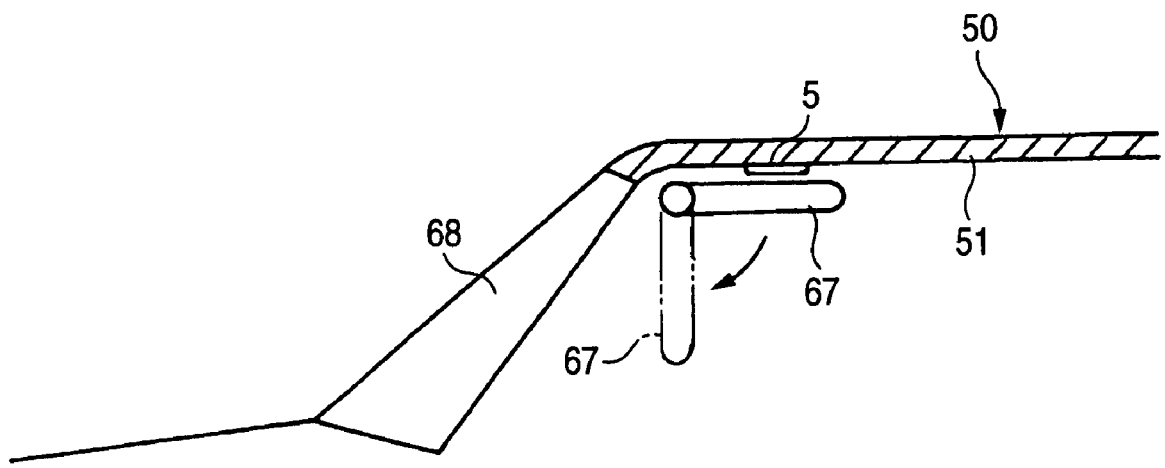
FIG. 5 is a view showing a condition that the room lamp of the first embodiment according to the invention is provided to the vehicle.

As shown in FIG. 5, the room lamp 5 is furnished in the ceiling trim 51 of the vehicle 50, and is disposed at the position to be hidden by the sun-visor 67 which is free to rotate and open.

Figure 6:
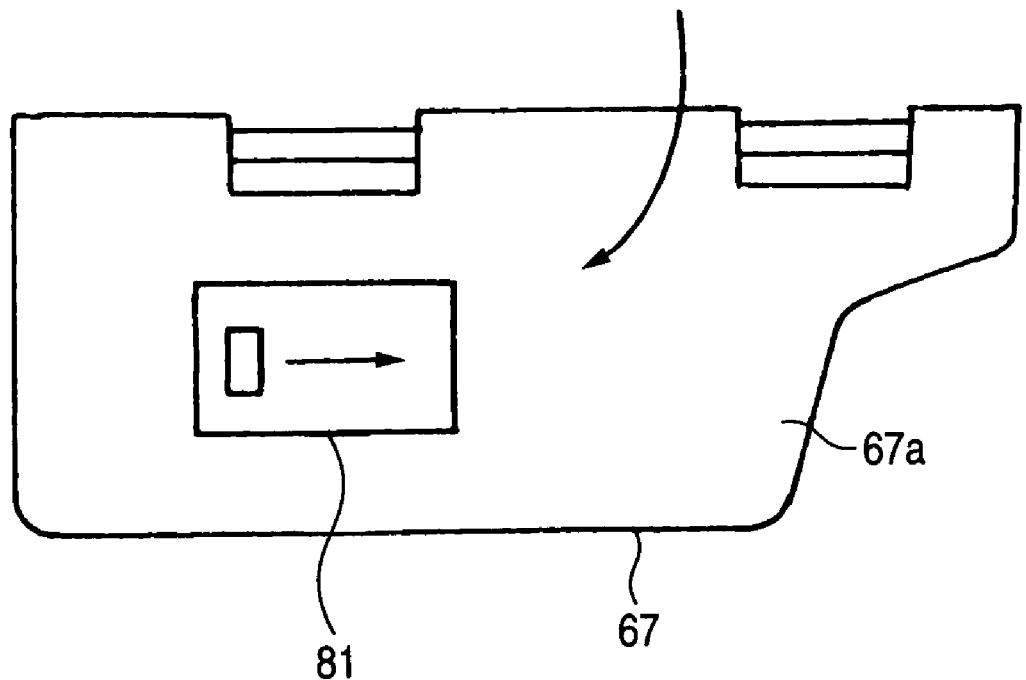
FIG. 6 is a view showing the sun-visor of the first embodiment according to the invention.
Figure 7:
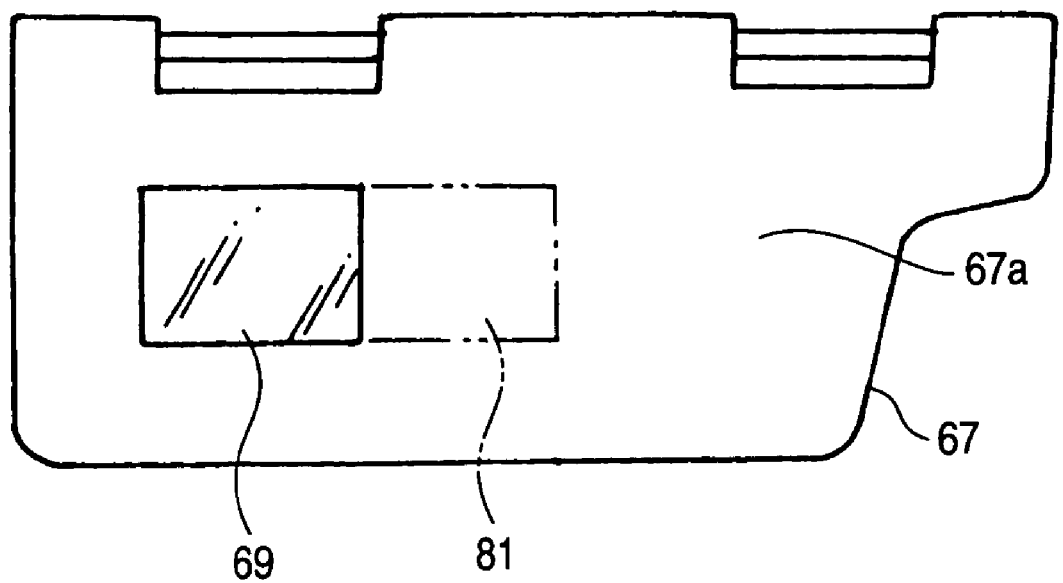
FIG. 7 is a view showing the mirror of the first embodiment according to the invention.

When turning on the room lamp 5, at first, as shown with two-dotted line in FIG. 5, the sun-visor 67 is opened to the side of the windshield glass 68. Next, as shown in FIGS. 6 and 7, a sliding door 81 is opened which is provided in a face 67a at the side of the ceiling trim 51 of the sun-visor 67.

Figure 8:
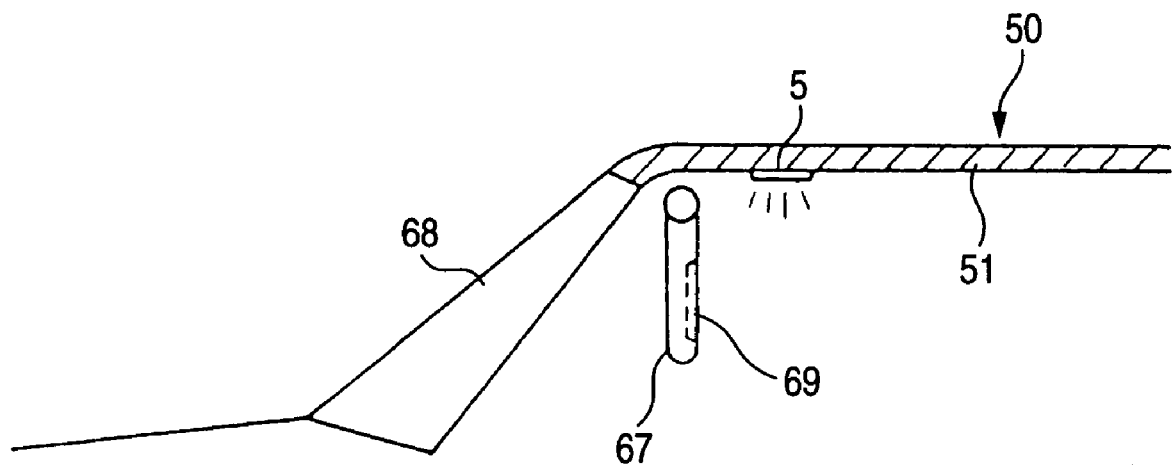
FIG. 8 is a view showing a condition of opening the sun-visor of the first embodiment according to the invention.

In such a manner, the mirror 69 provided in the sun-visor 67 is exposed. At the same time as this, as shown in FIG. 8, the room lamp 5 is lighted. An image reflected in the mirror 69 can be clearly seen.

As is seen above, the room lamp 5 of the invention can be held in such a way that the edge part at one side of the room lamp 5 is caught at the edge part of the room lamp attaching hole 52 by the clip 58, while the edge part of the other side is kept by the function main body 60 and the design part 55.

Accordingly, since the clip 58 is sufficient with one side, i.e., one piece in the present embodiment, the room lamp 5 can be miniaturized as a whole, and at the same time, the room lamp attaching hole 52 in the ceiling trim 51 may be reduced in size. Thereby, the cost-down is possible.

The thin hinge 65 projects from the function main body 60 toward the rear face 51a of the ceiling trim 51. When the ceiling trim 51 is kept by the function main body 60 and the design part 55, the thin hinge 65 is pushed to the ceiling trim 51 and serves as the elastic member, so that it is possible to prevent the room lamp 5 from rattling.

Since the thin hinge 65 is also used as the elastic member, it is possible to save the number of parts and realize cost-down. The elastic member is not limited to the thin hinge 65, and may be provided apart from the thin hinge 65.

Figure 9:
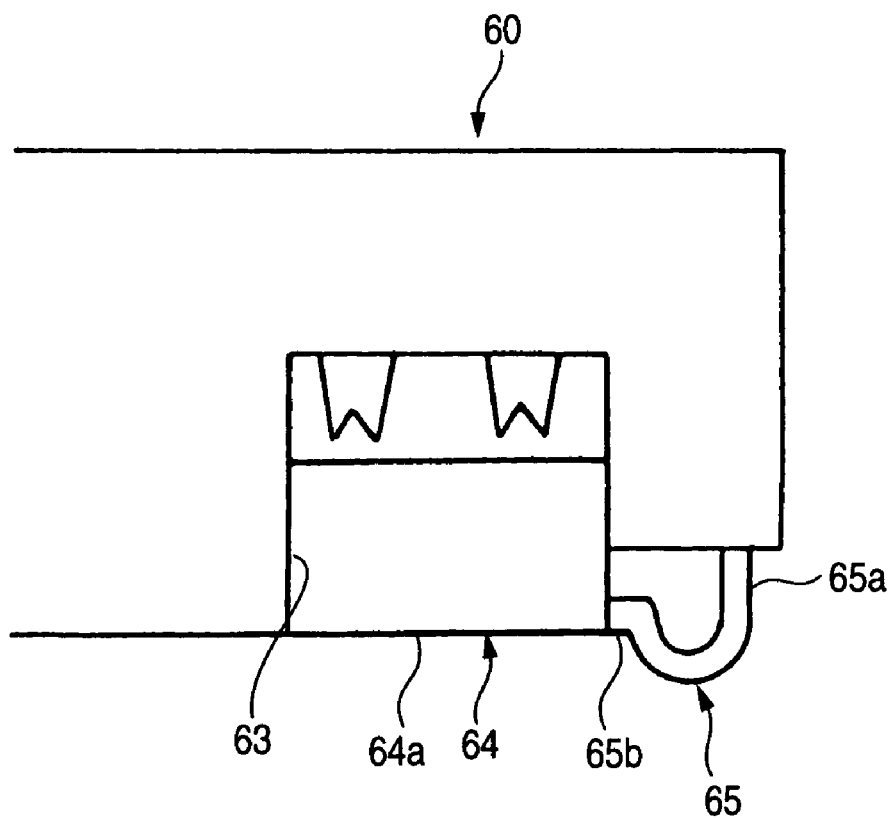
FIG. 9 is a view showing another elastic part of the first embodiment according to the invention.

The above mentioned thin hinge 65 is, as shown in FIG. 9, formed such that the end part 65a at the side of the function main body 60 projects from the function main body 60 toward the rear face 51a of the ceiling trim 51, and concurrently the end part 65b at the side of the cover 64 in the thin hinge 65 is formed to project from the cover along the extended flat face of the surface in the cover.

In this case, although being thin, the thin hinge 65 can have good elasticity.

Figure 10:
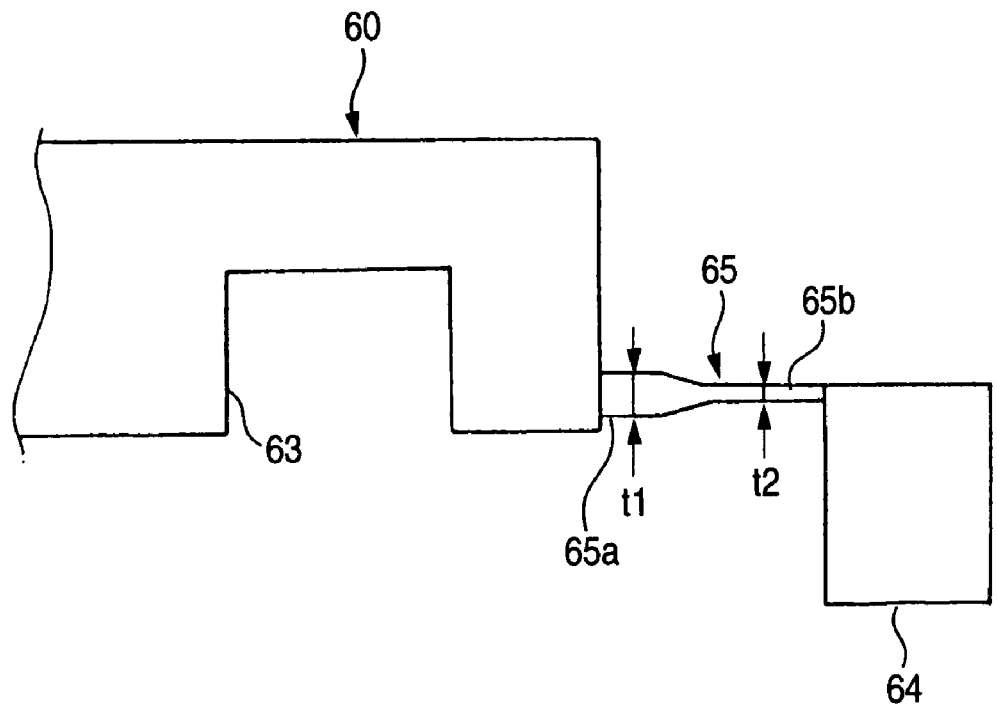
FIG. 10 is a view showing a further elastic part of the first embodiment according to the invention.

Further, as shown in FIG. 10, strength in the curve at the end part 65a at the side of the function main body 60 in the thin hinge 65 may be made higher than strength in the curve of the end part 65b at the side of the cover 64 in the thin hinge 65. In this embodiment, thickness t1 of the end part 65a at the side of the function main body 60 is larger than thickness t2 of the end part 65b at the side of the cover 64.

Figure 11:
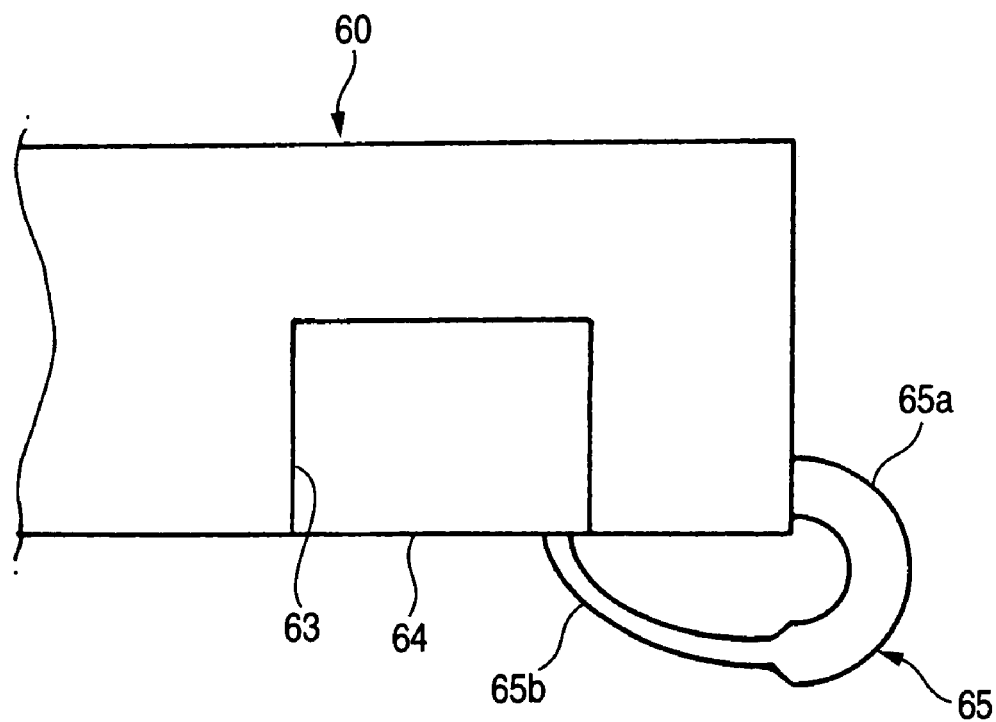
FIG. 11 is a view showing a still further elastic part of the first embodiment according to the invention.

In this case, as shown in FIG. 11, when the cover 64 is inserted in the concave part 63, since the end part 65a at the side of the function main body 60 in the thin hinge 65 has the comparatively large curve, this part projects comparatively largely from the function main body 60. Accordingly, this projecting part may be preferably used as the elastic member.

Second Embodiment

Figure 12:
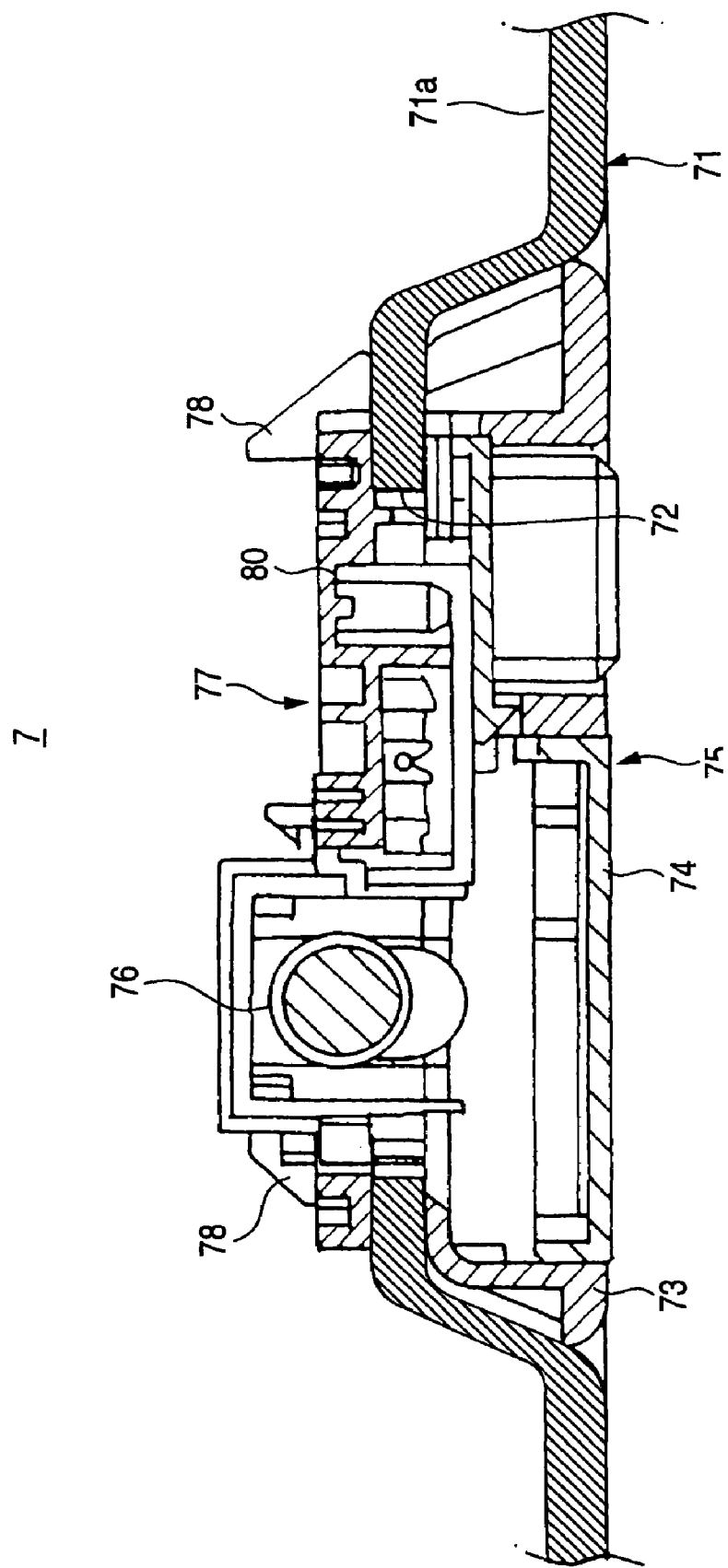
FIG. 12 is a view showing a second embodiment according to the invention.

FIG. 12 shows the doom lamp 7 being the room lamp of the second embodiment. The doom lamp 7 has the design part 75 and the function part 77, said design part 75 being secured with the lens 74 in the bezel 73 attachable to the opening 72 defined in the ceiling trim 71 as the interior finish material of the vehicle, and said function part 77 being disposed at the rear side of the ceiling trim 71 supported by the design part 75, and having the light source 76.

Figure 13:
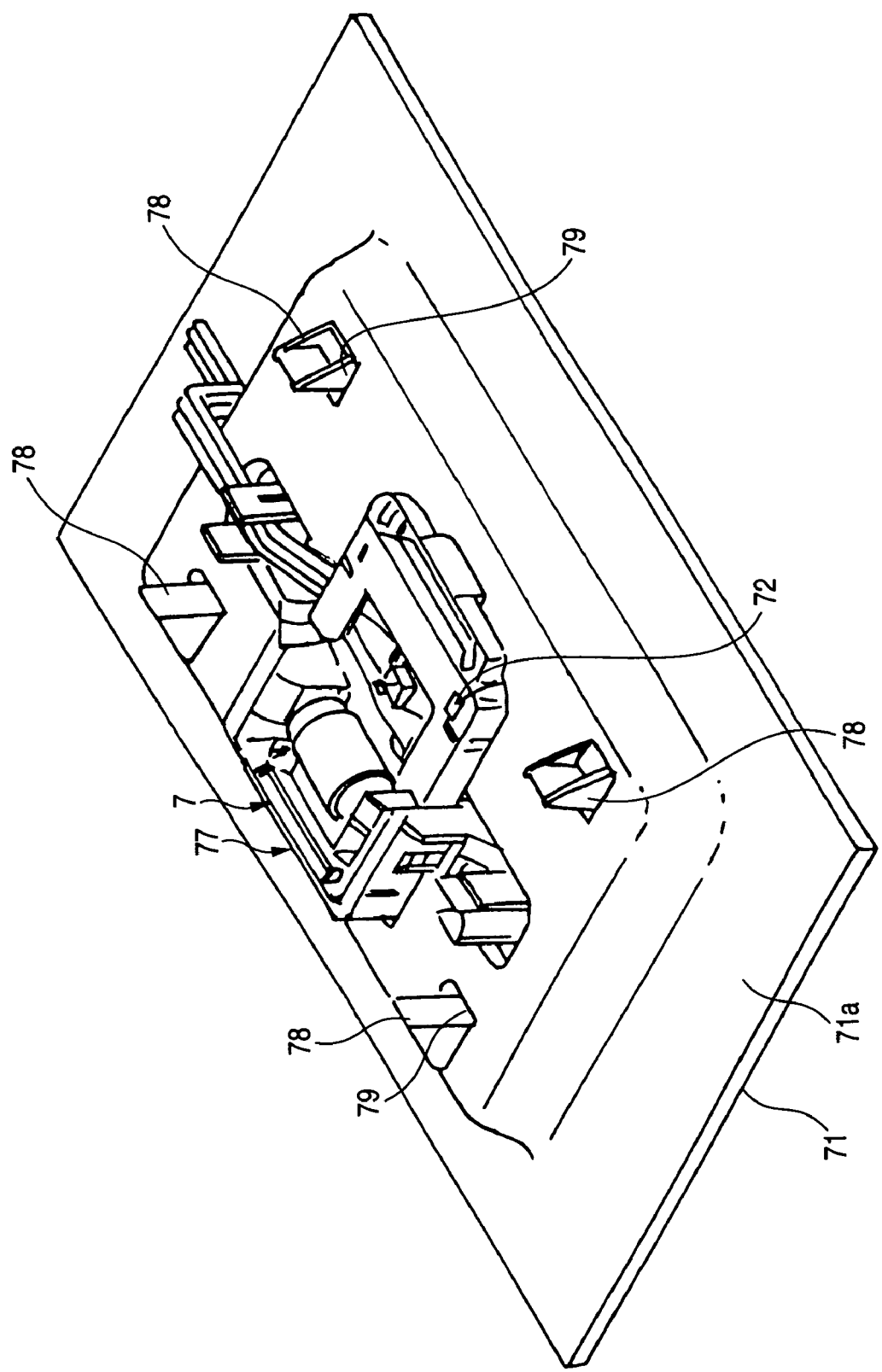
FIG. 13 is a perspective view showing the second embodiment according to the invention.

As shown in FIG. 13, the doom lamp 7 is structured in that the design part 75 is able to engage the edge parts of the attaching holes 79 formed in the ceiling trim 71 by the clips 78 furnished at the four corners of the bezel 73.

Further, as shown in FIG. 12, the function main body 80 of the function part 77 is supported by the function part 77 such that it projects along the rear face 71a of the ceiling trim 71 from the edge part of the opening 72.

Figure 14:
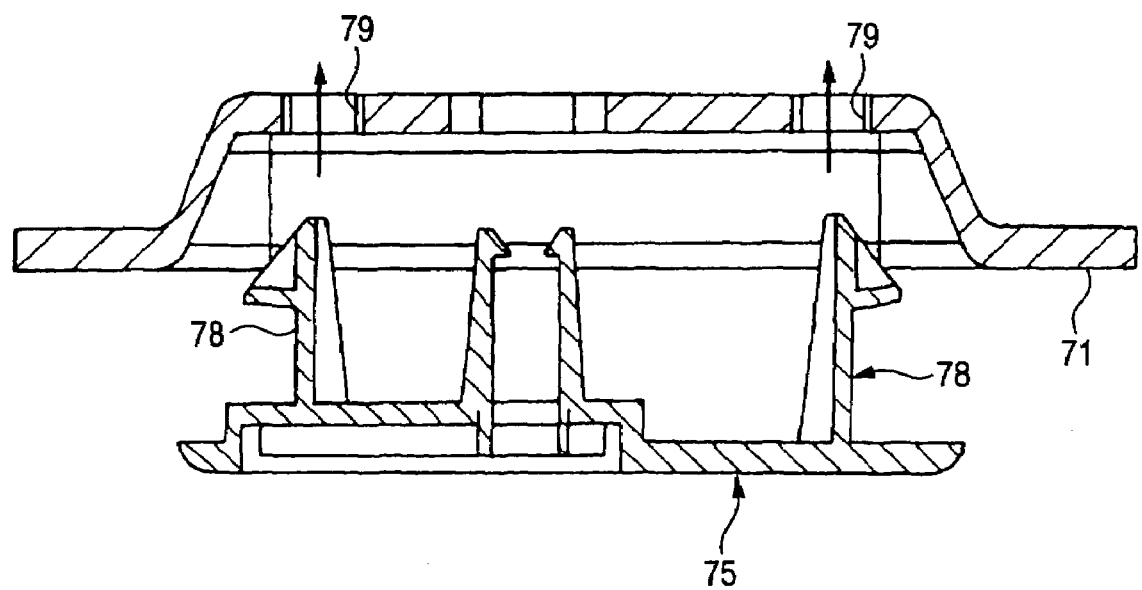
FIG. 14 is a view showing the second embodiment according to the invention.
Figure 15:
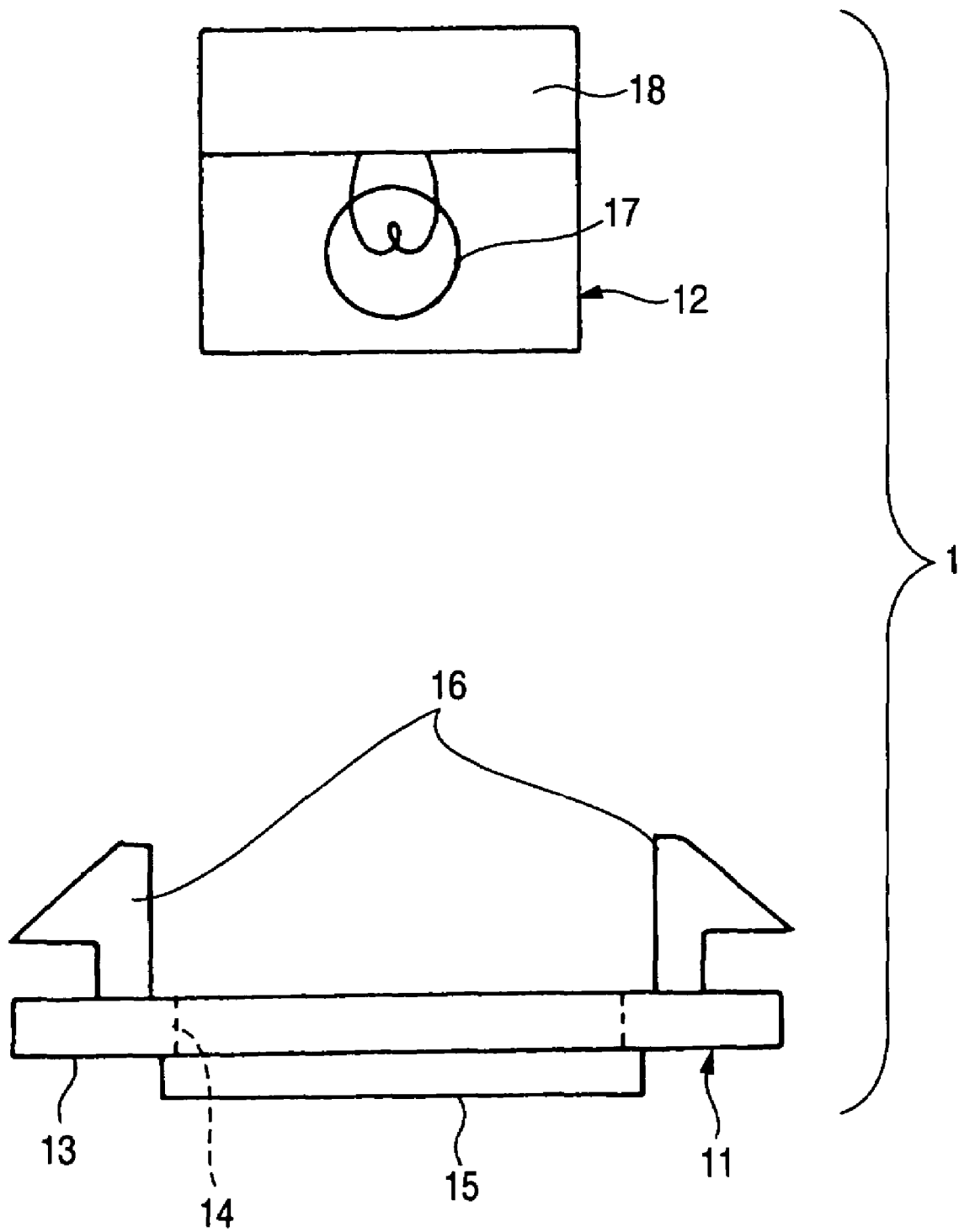
FIG. 15 is a view showing the prior art room lamp.
Figure 16:
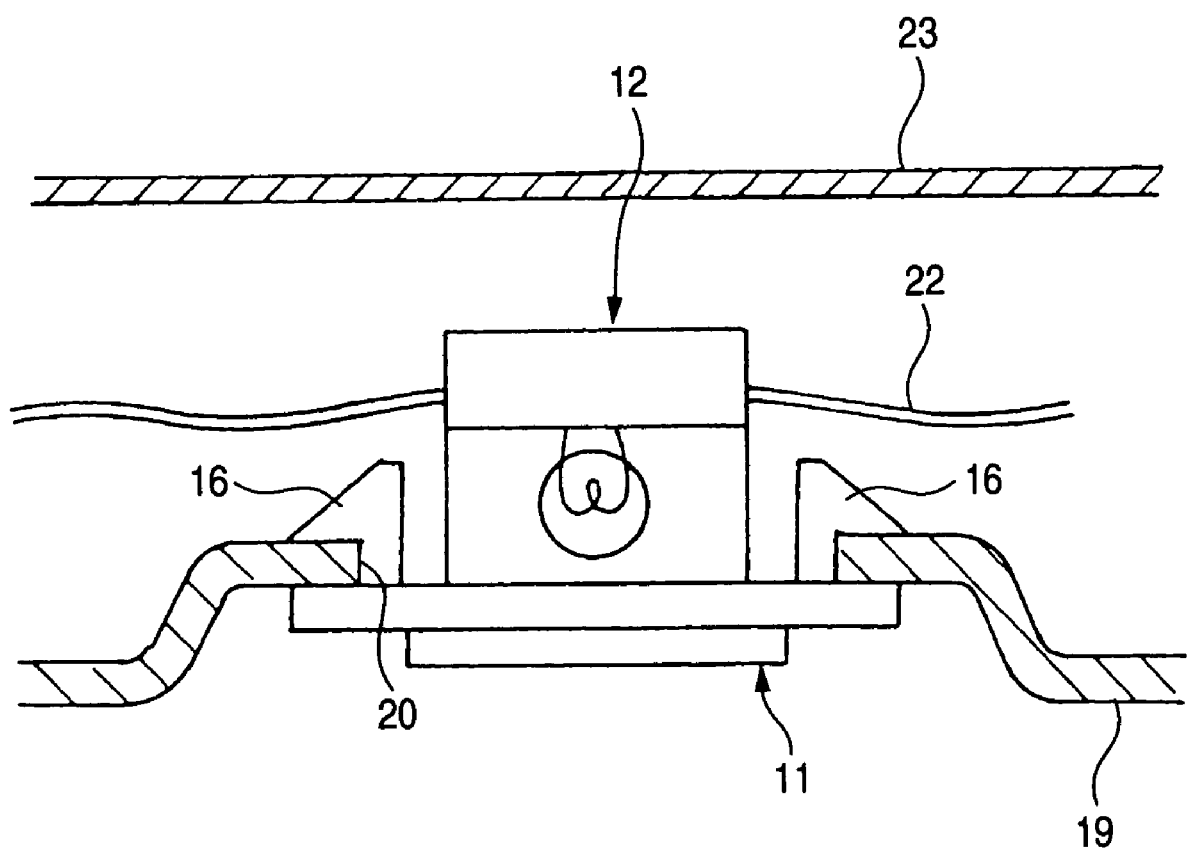
FIG. 16 is a view showing the condition that the prior art room lamp is attached to the ceiling trim.
Figure 17:
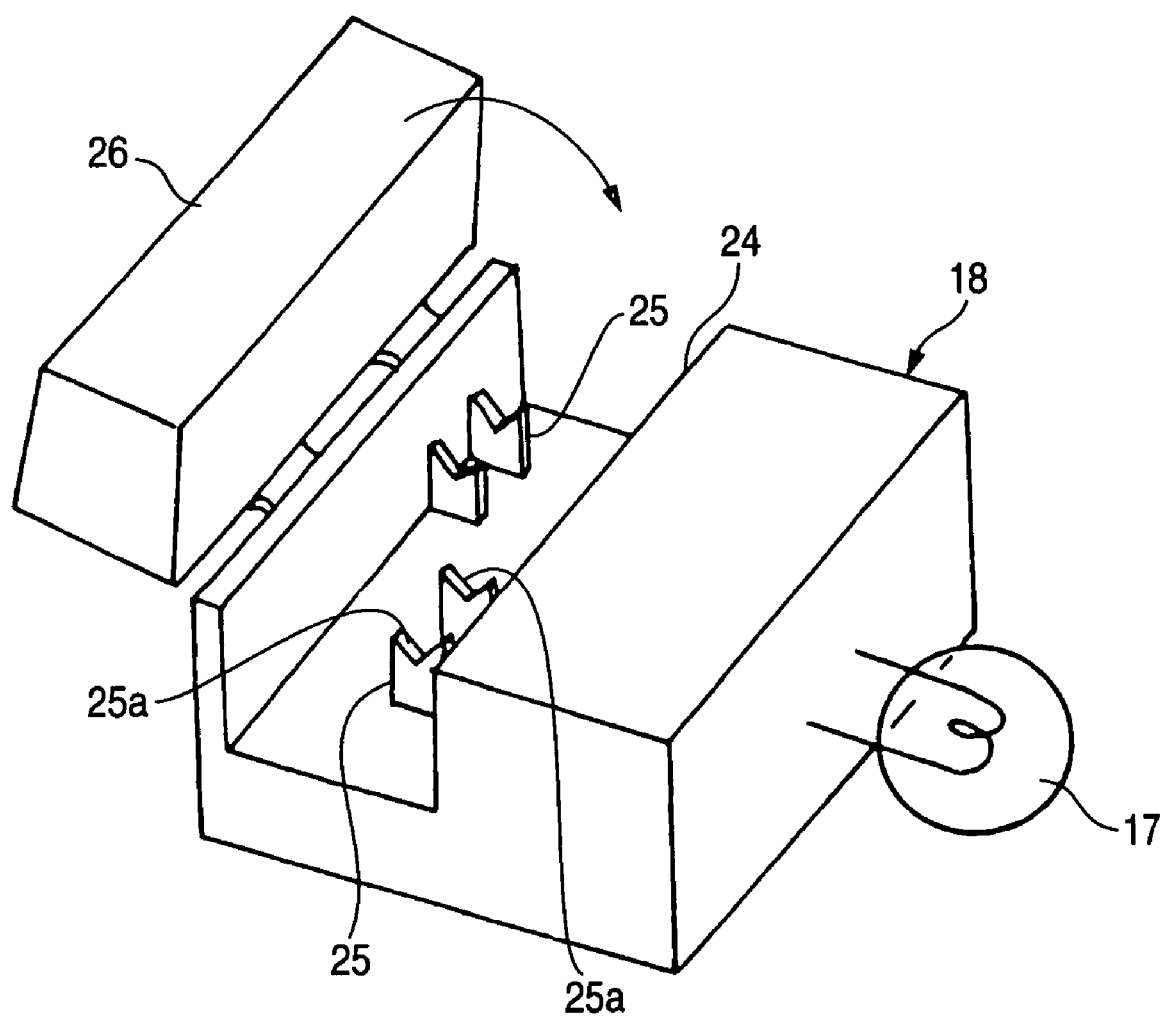
FIG. 17 is a view showing the prior art design part.
Figure 18:
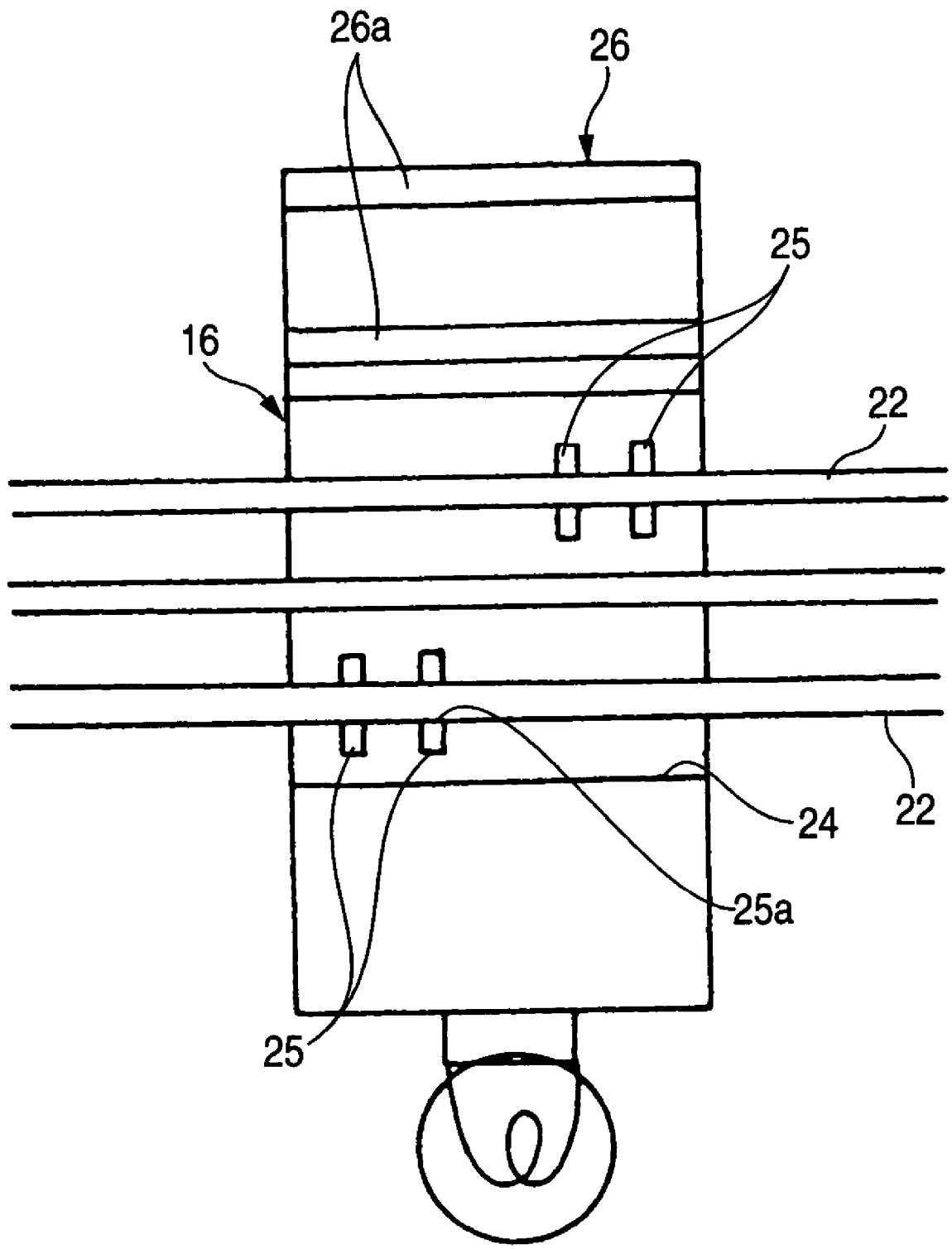
FIG. 18 is a view for explaining the method of connecting the flat cables to the prior art design part.
Figure 19:
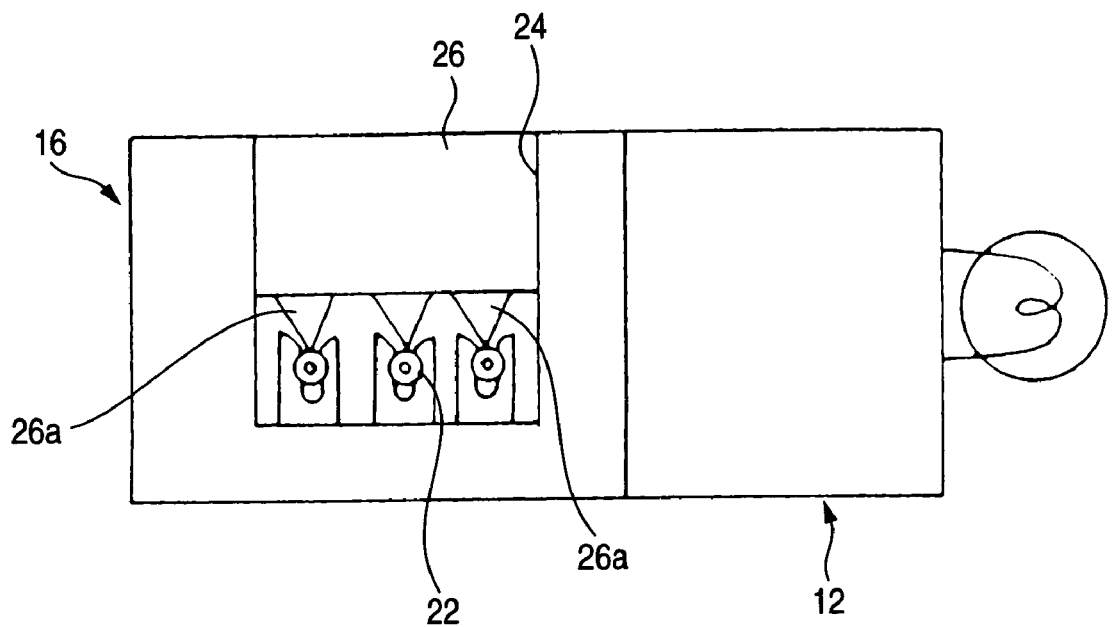
FIG. 19 is a view showing the condition of closing the cover of the prior art design part.
Figure 20:
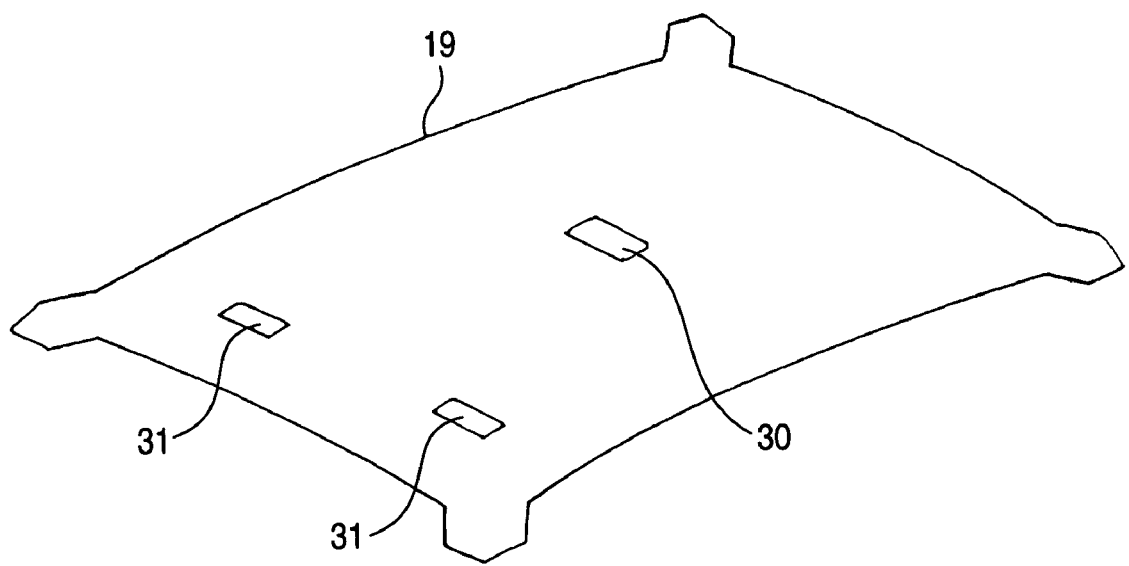
FIG. 20 is a view showing the general ceiling trim.
Figure 21:
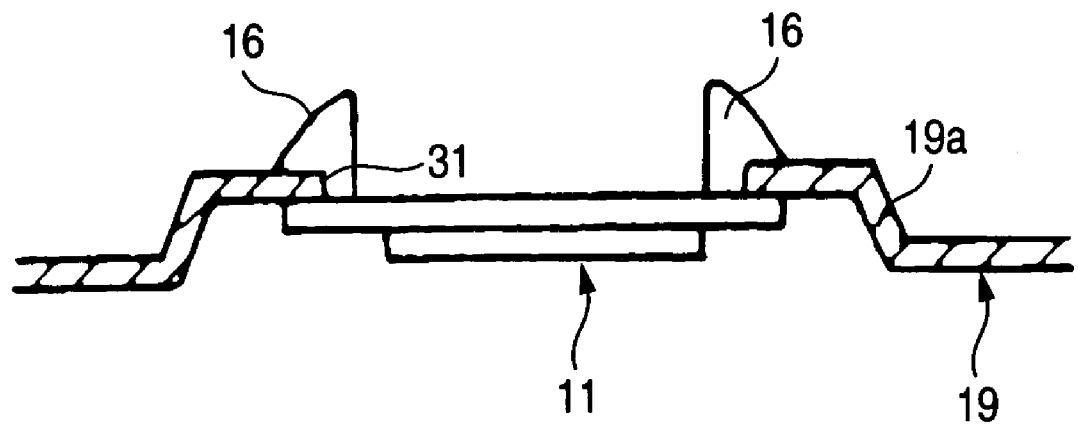
FIG. 21 is a view showing the method of attaching the prior art room lamp to the ceiling trim.
Figure 22:
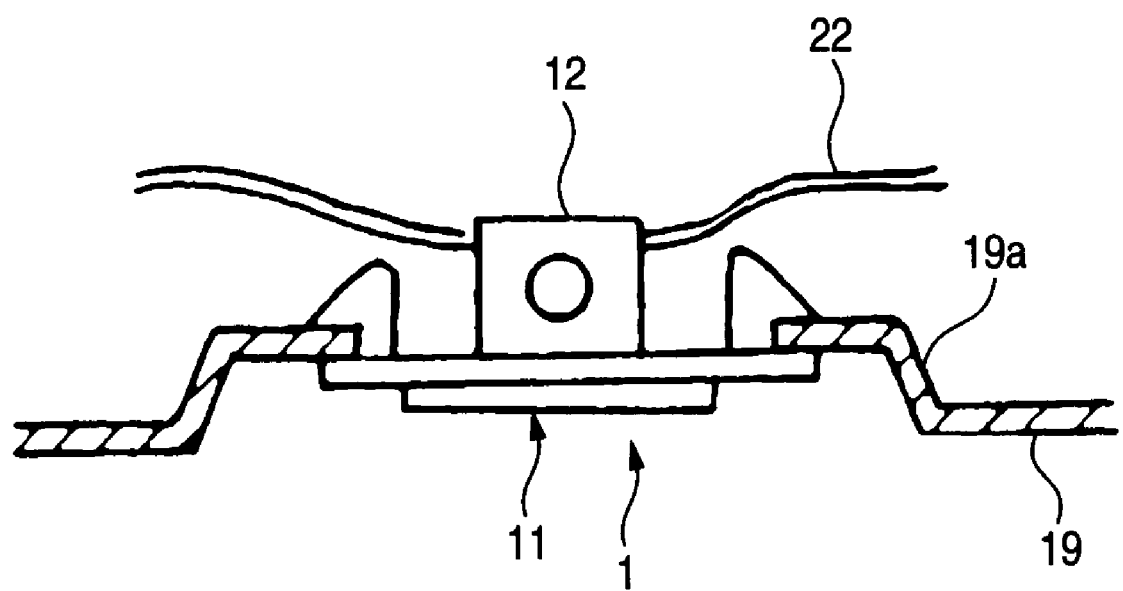
FIG. 22 is a view showing the method of attaching the prior art room lamp to the ceiling trim.
Figure 23:
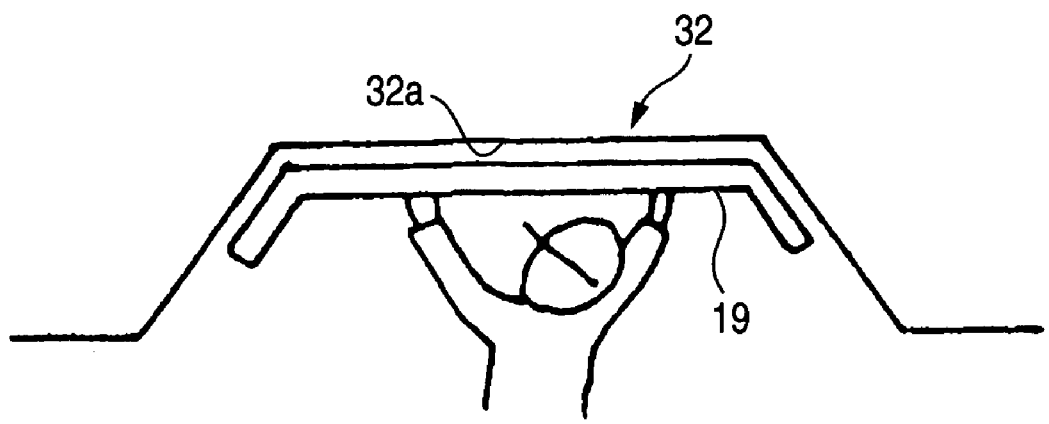
FIG. 23 is a view showing the method of attaching the prior art room lamp to the ceiling trim.
Figure 24:
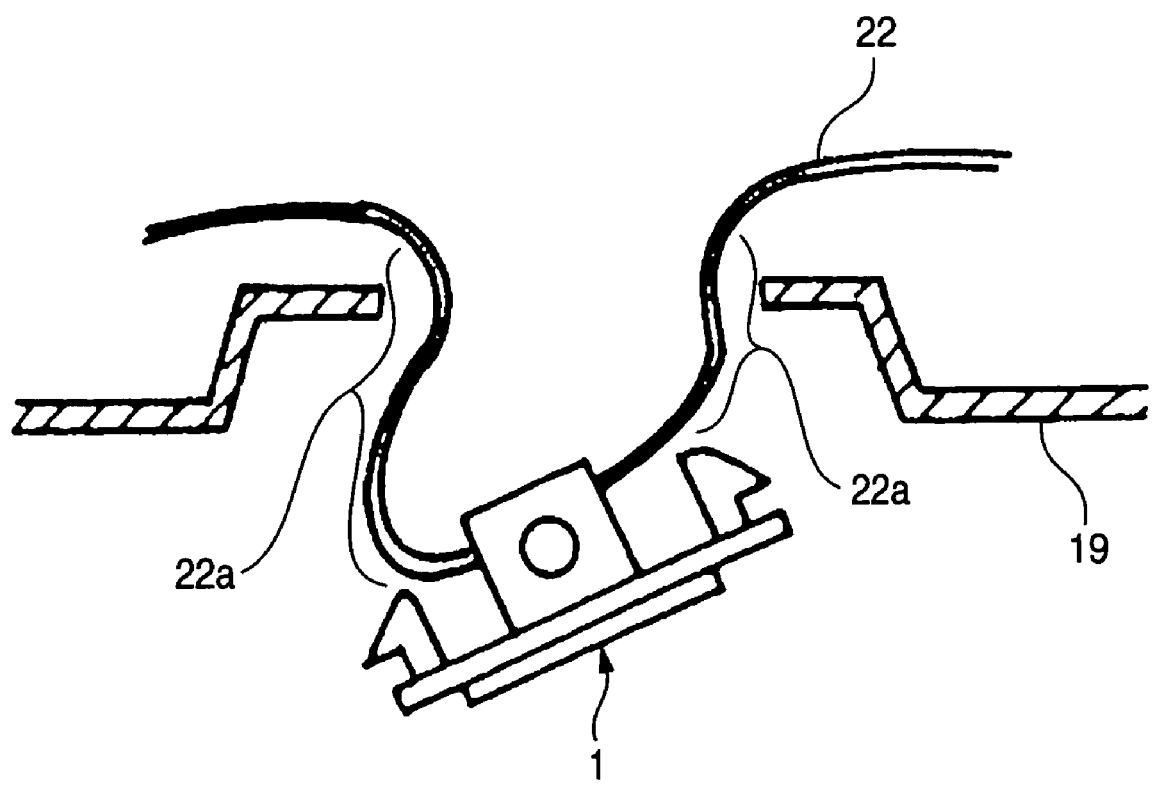
FIG. 24 is a view showing the method of taking off the prior art room lamp from the ceiling trim.
Figure 25:
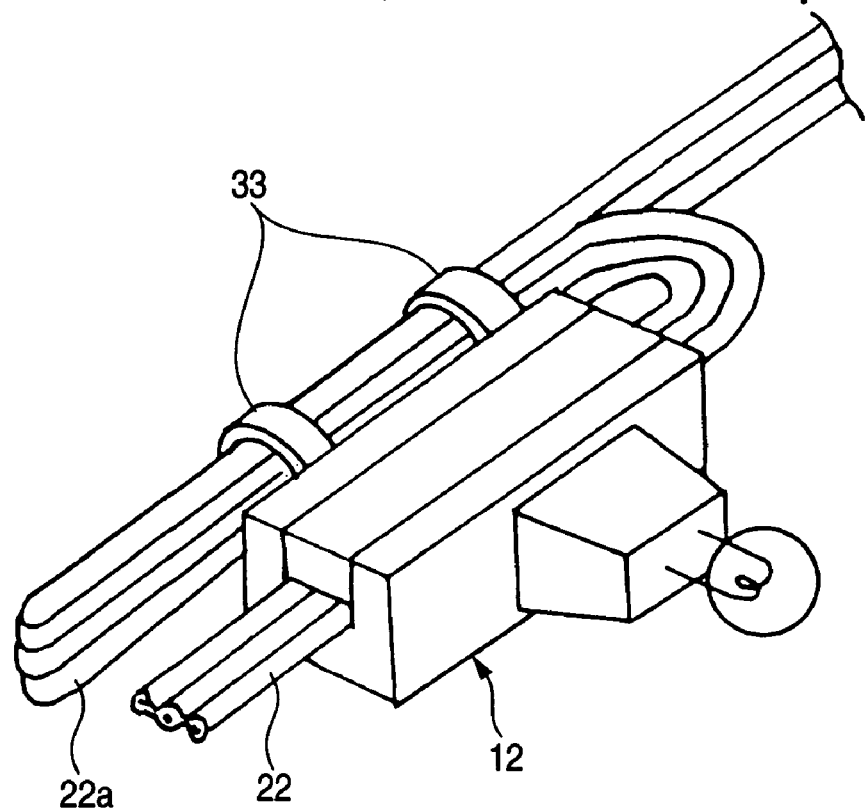
FIG. 25 is a view showing the flat cables holding the extra length parts of the prior art flat cables.
Figure 26:
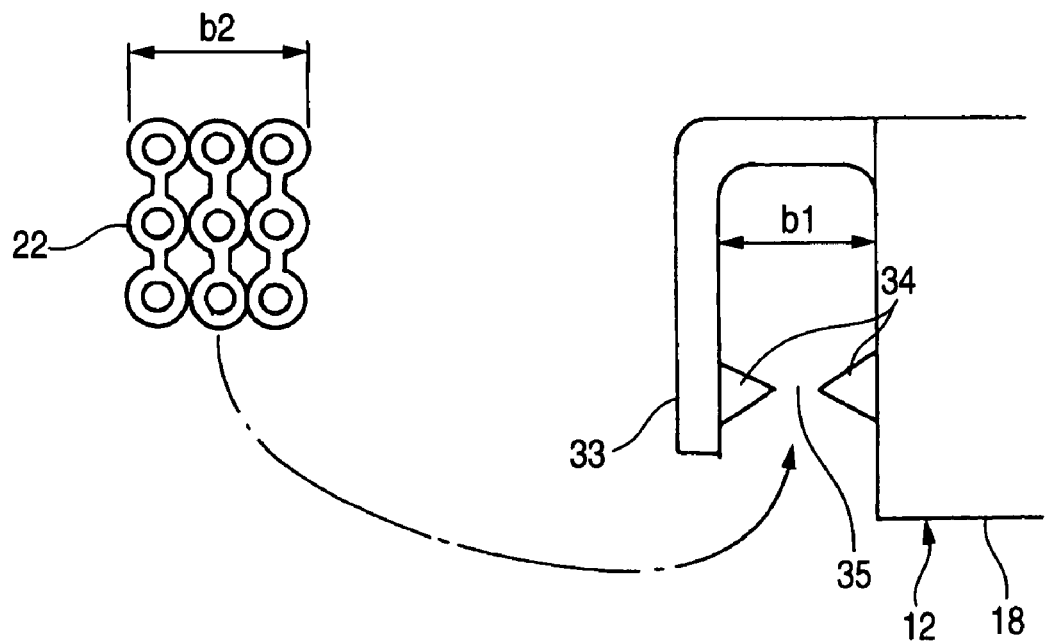
FIG. 26 is a view showing the prior art flat cables.
Figure 27:
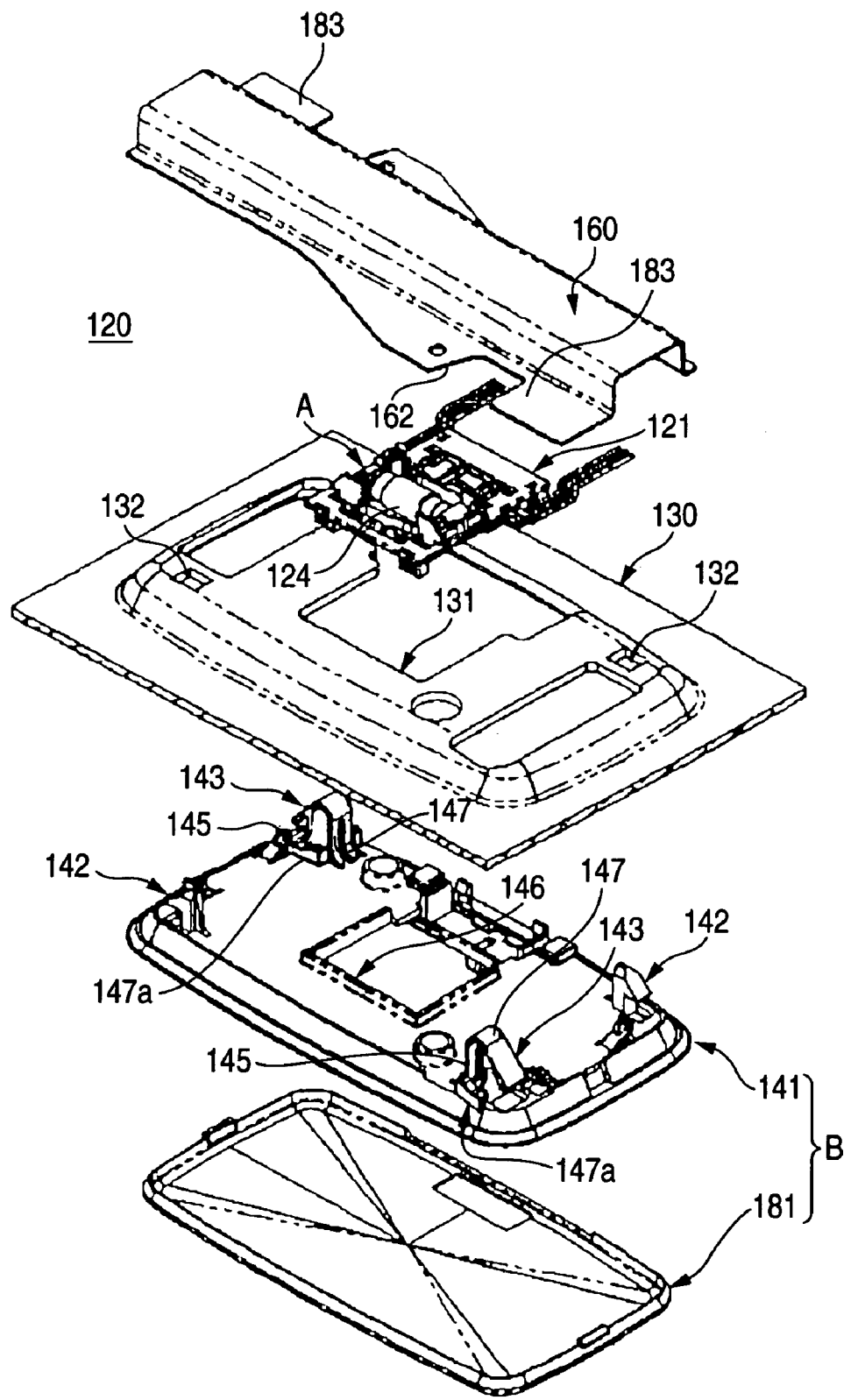
FIG. 27 is a disassembled view showing an example of the prior art.
Figure 28:
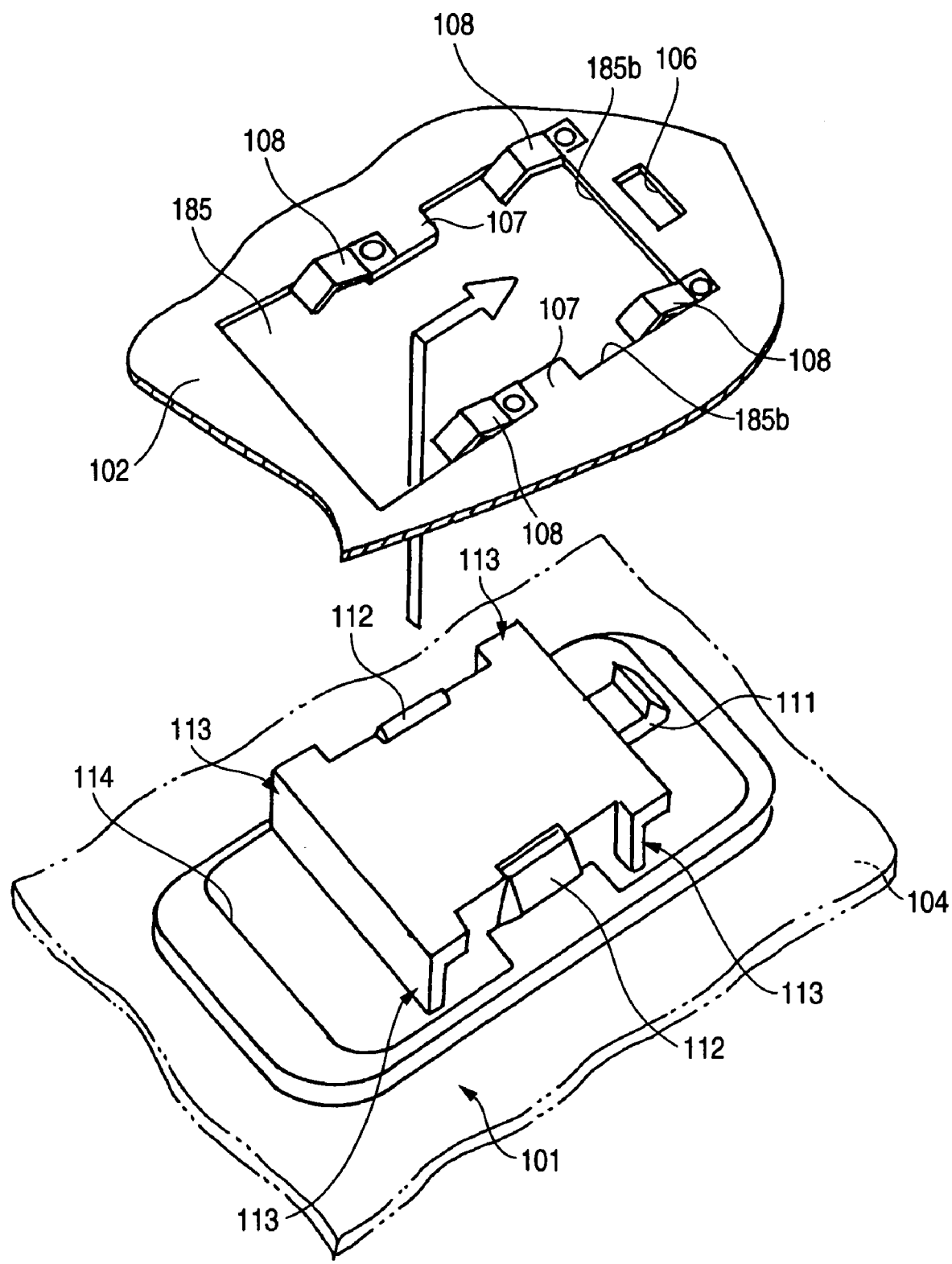
FIG. 28 is a disassembled perspective view showing another example of the prior art.

For attaching the doom lamp 7 to the ceiling trim 71, as shown in FIG. 14, at first, the design part 75 is solely attached to the ceiling trim 71. At this time, the clips 78 of the design part 75 are inserted in the attaching holes 79.

Next, from the side of the rear face 71a of the ceiling trim 71, the function part 77 is attached to the design part 75. Thereby, as shown in FIG. 12, the ceiling trim 71 is kept by the function main body 80 and the design part 75, and the whole doom lamp 7 is held by the ceiling trim 71.

Third Embodiment

A third embodiment according to the invention will be explained in detail with reference to the attached drawings.

Figure 29:
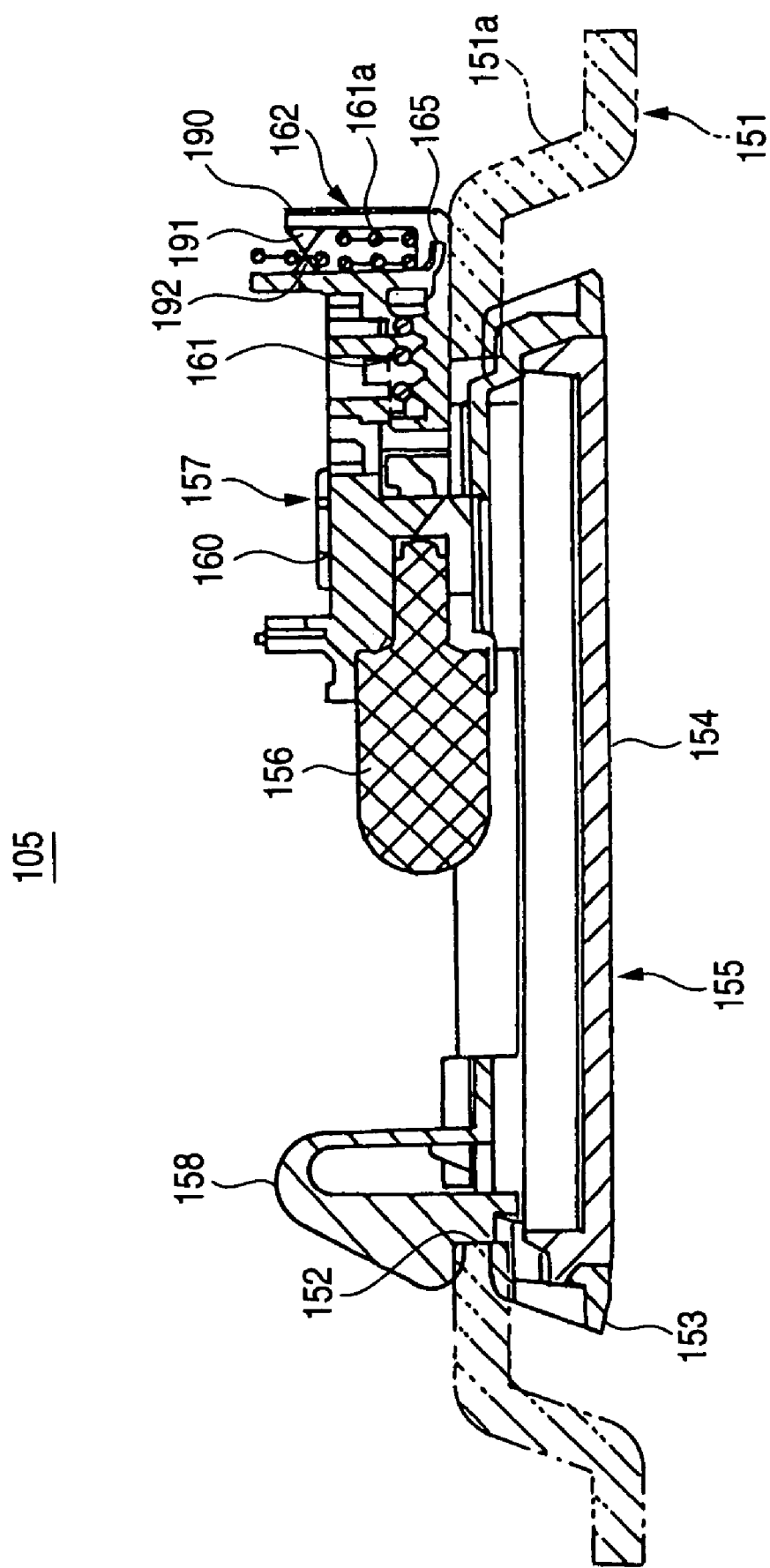
FIG. 29 is a cross sectional view showing a third embodiment according to the invention.

As shown in FIG. 29, the room lamp 105 according to the third embodiment of the invention has the design part 155 and the function part 157, said design part 155 being secured with the lens 154 in the housing 153 attachable to the opening 152 defined in the interior finish material 151 of the vehicle, and said function part 157 being disposed at the side of the rear face 151a of the interior finish material 151 in that the function part 157 is supported by the design part 155, and having the light source 156.

Figure 30:
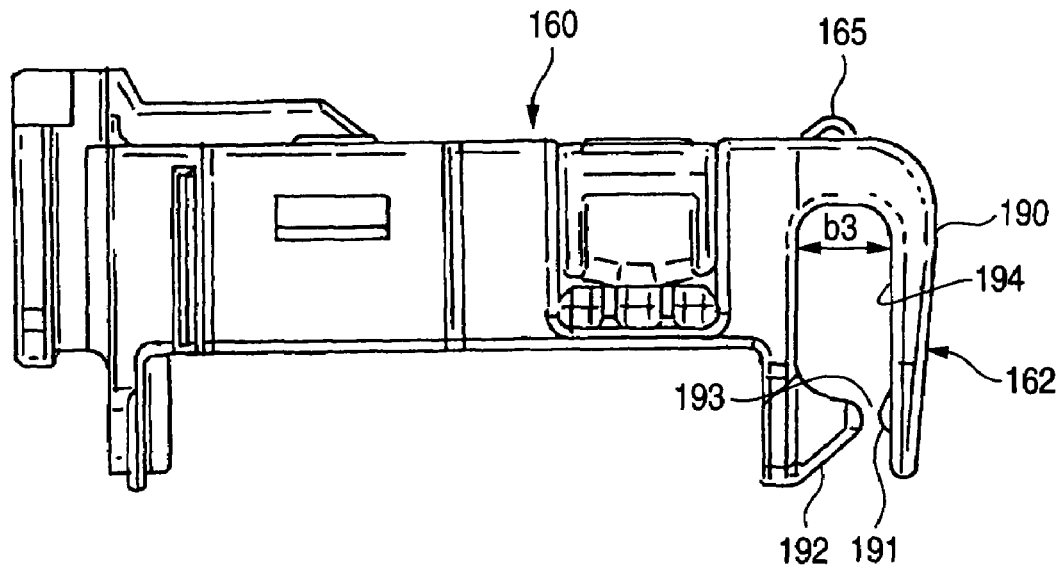
FIG. 30 is a disassembled view showing the third embodiment according to the invention.

The room lamp 105 is, as shown in FIG. 30, that the clips 158 are provided in the housing 153 for temporarily securing the design part 155 at the predetermined positions, said clips 158 being able to engage the edge part of the opening 152 of the interior finish material 151, and at the same time, the projections 159 project from the edge part of the opening 152 along the rear face 151a of the interior finish material 151 from the edge of the opening 152 and are provided to the function main body 170 of the function part 159.

Figure 31:
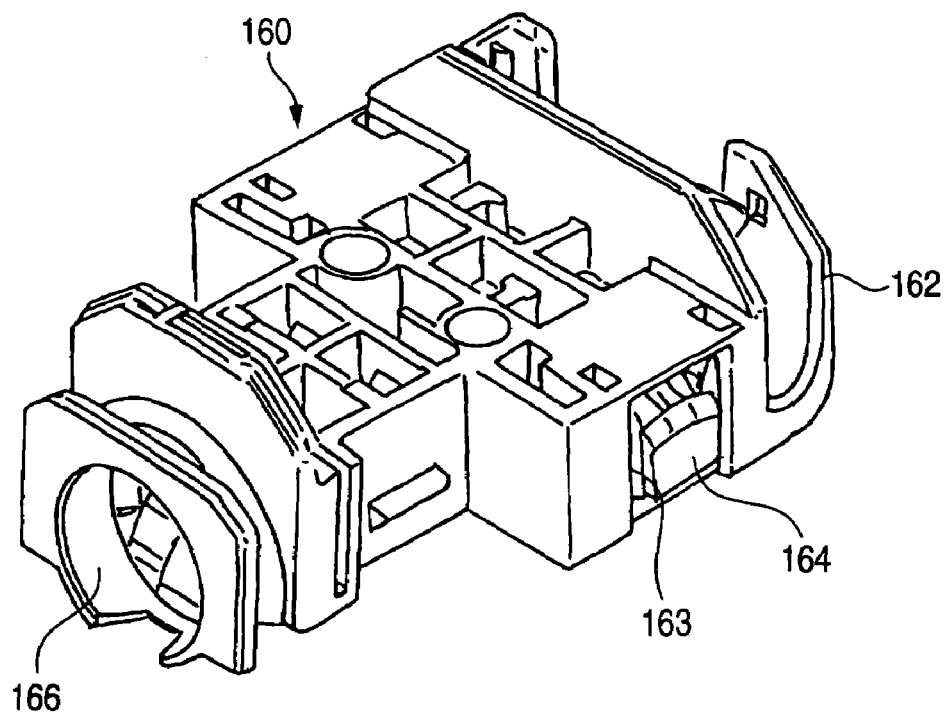
FIG. 31 is a perspective view showing a setting-up condition of the third embodiment according to the invention.

The room lamp 105 is, as shown in FIGS. 29 and 31, so structured that the housing 153 and the projections 159 hold the interior finish material 151 for providing self-preservation in that the function part 157 is supported by the design part 155.

For attaching the room lamp 15 to the interior finish material 151, as shown in FIG. 30, at first, the design part 155 is attached in the opening 152 from the side of an upper surface 151b of the interior finish material 151. At this time, the clips 158 of the design part 155 are engaged to the edge of the opening 152 to temporarily secure the design part 155 to the interior finish material 151.

Next, a wire harness (not shown) is arranged to the rear face 151a of the interior finish material 151. Subsequently, the function part 157 is set up on the design part 155 from the side of the rear face 51a of the interior finish material 151. Thereby, as shown in FIG. 29, the edge part of the opening 152 in the interior finish material 151 is held by the projections 159 of the function part 157 and the housing 153 of the design part 155.

In such a manner, after having attached the room lamp 105 to the interior finish material 151, the interior finish material 151 is provided in a ceiling of the vehicle.

The room lamp 105 is self-preserved in that the interior finish material 151 is held by the projections 159 provided to the function main body 170 and the housing 153 provided to the design part 155, and therefore, it is not necessary to furnish the fixture or engaging member to the room lamp for securing the room lamp to the interior finish material as the prior art. In addition, the reinforcing member is not required to the side of the 104.

Accordingly, the structures of the room lamp 105 and the vehicle may be simplified, concurrently the number of parts may be saved to, and the cost-down is possible.

Further, the same room lamp 105 may be used, irrespective of providing the reinforce of the vehicle or being different in quality of materials of the ceiling.

What is claimed is:

1. A room lamp comprising:
    a design part including a housing and a lens attached thereto, said housing being attached to an opening formed in an interior finish material of a vehicle;
    a function part, having a light source, disposed on a rear side of the interior finish material and supported by the design part;
    clips, for temporarily securing the design part at predetermined positions, provided in the housing, said clips engaging an edge part of the opening; and
    an elastic member projecting toward a rear face of the interior finish material from the function part,
    wherein the design part supports the function part through the interior finish material to hold the design part and the function part with at least a portion of the interior finish material sandwiched therebetween and
    wherein the light from the light source passes through the opening and the lens.

2. A room lamp comprising:
    a design part including a bezel and a lens attached thereto, the bezel being attached to an opening formed in an interior finish material of a vehicle;
    a function part, having a light source, disposed on a rear side of the interior finish material and supported by the design part;
    a clip, provided on the bezel, engaging the design part with an edge portion of the opening; and
    an elastic member projecting toward the rear face of the interior finish material from the function main body,
    wherein the function part includes a function main body that is supported by the function part such that the function main body projects along the rear face of the interior finish material from the edge portion of the opening and
    wherein the light from the light source passes through the opening and the lens.

3. The room lamp as claimed in claim 2, further comprising:
    a cover integrally formed on the function main body through a thin hinge,
    wherein when the cover closes the function main body, the thin hinge projects than the function main body toward the rear face of the interior finish material.

4. The room lamp as claimed in claim 3, wherein the end part, at the side of the function main body of the thin hinge, projects from the function main body toward the rear face of the interior finish material, and concurrently the end part, at the side of the cover, of the thin hinge projects from the cover along an extended flat face of the surface in the cover.

5. The room lamp as claimed in claim 3, wherein strength in the curve at the end part at the side of the function main body in the thin hinge is higher than strength in the curve at the end part ax the side of the cover in the thin hinge.

6. A room lamp as set forth in claim 4, further comprising:
a projection portion, provided on the function main body of the function part, projecting from the edge part of the opening along the rear face of the interior finish material, wherein the housing end the projection portion hold the interior finish material interposed between the housing and the projection portions.

* * * * *